US012636818B2

(12) United States Patent
Yoshimatsu et al.

(10) Patent No.: US 12,636,818 B2
(45) Date of Patent: May 26, 2026

(54) STRETCHING APPARATUS AND PARTS REPLACEMENT METHOD OF STRETCHING APPARATUS

(71) Applicant: THE JAPAN STEEL WORKS, LTD., Tokyo (JP)

(72) Inventors: Naoaki Yoshimatsu, Tokyo (JP); Ichiro Nakajima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 124 days.

(21) Appl. No.: 18/793,434

(22) Filed: Aug. 2, 2024

(65) Prior Publication Data

US 2024/0391142 A1      Nov. 28, 2024

Related U.S. Application Data

(62) Division of application No. 17/437,043, filed as application No. PCT/JP2020/006375 on Feb. 18, 2020, now Pat. No. 12,090,688.

(30) Foreign Application Priority Data

Apr. 18, 2019    (JP) ................................. 2019-079077

(51) Int. Cl.
*B29C 35/02* (2006.01)
*B29C 48/00* (2019.01)
(Continued)

(52) U.S. Cl.
CPC .......... *B29C 35/02* (2013.01); *B29C 48/0018* (2019.02); *B29C 48/08* (2019.02);
(Continued)

(58) Field of Classification Search
CPC ..... B29C 48/0018; B29C 48/08; B29C 48/30; B29C 48/305; B29C 48/35; B29C 55/12;
(Continued)

(56) References Cited

U.S. PATENT DOCUMENTS

| | | | |
|---|---|---|---|
| 2009/0085236 A1 | 4/2009 | Arai et al. | |
| 2009/0199374 A1 | 8/2009 | Sano et al. | |
| 2016/0096312 A1 | 4/2016 | Shimizu et al. | |
| 2017/0066175 A1 | 3/2017 | Shimizu et al. | |

(Continued)

FOREIGN PATENT DOCUMENTS

| | | |
|---|---|---|
| JP | S61-058723 A | 3/1986 |
| JP | 2004-155138 A | 6/2004 |

(Continued)

OTHER PUBLICATIONS

International Search Report from International Patent Application No. PCT/JP2020/006375, May 12, 2020.
Office Action issued Feb. 8, 2023, in Chinese Patent Application No. 202080029087.9.

(Continued)

*Primary Examiner* — Galen H Hauth
*Assistant Examiner* — Mohamed K Ahmed Ali
(74) *Attorney, Agent, or Firm* — Potomac Law Group, PLLC

(57)      ABSTRACT

A film stretching apparatus includes: a pair of first and second link devices configured to be able to carry and stretch a film and each composed of a plurality of links coupled to form an endless chain; a heat treatment unit configured to cover a central portion of the first and second link devices and perform a heat treatment to the film; a sprocket (first link drive mechanism) arranged outside the heat treatment unit and on an inlet side of the film and configured to drive the plurality of links; a sprocket (second link drive mechanism) arranged outside the heat treatment unit and on an outlet side of the film and configured to drive the plurality of links; and a sprocket (link adjustment mechanism) arranged outside the heat treatment unit and on the outlet side of the film and configured to reduce a pitch of the plurality of links.

2 Claims, 12 Drawing Sheets

(51) Int. Cl.

| | |
|---|---|
| *B29C 48/08* | (2019.01) |
| *B29C 48/28* | (2019.01) |
| *B29C 48/30* | (2019.01) |
| *B29C 48/88* | (2019.01) |
| *B29C 55/12* | (2006.01) |
| *B29C 55/20* | (2006.01) |
| *B29C 55/30* | (2006.01) |

(52) U.S. Cl.
CPC .............. *B29C 48/28* (2019.02); *B29C 48/30* (2019.02); *B29C 48/911* (2019.02); *B29C 55/12* (2013.01); *B29C 55/20* (2013.01); *B29C 55/30* (2013.01)

(58) Field of Classification Search
CPC ....... B29C 55/20; B29C 55/30; B29C 55/165; B29C 55/06
See application file for complete search history.

(56) References Cited

FOREIGN PATENT DOCUMENTS

| | | | | | |
|---|---|---|---|---|---|
| JP | 2005-313403 | A | | 11/2005 | |
| JP | 2006-205409 | A | | 8/2006 | |
| JP | 2016-132152 | A | | 7/2016 | |
| JP | 2016129961 | A | * | 7/2016 | ............... G02B 5/30 |
| JP | 2017-109423 | A | | 6/2017 | |
| KR | 10-2016-0003271 | A | | 1/2016 | |
| WO | WO 2008/010479 | A1 | | 1/2008 | |

OTHER PUBLICATIONS

Office Action issued Aug. 30, 2022, in Japanese Patent Application No. 2019-079077.

Office Action issued Jan. 28, 2025, in Korean Patent Application No. 10-2021-7033220.

* cited by examiner

STRETCHING APPARATUS AND PARTS REPLACEMENT METHOD OF STRETCHING APPARATUS

INCORPORATION BY REFERENCE

This application is a divisional of U.S. patent application Ser. No. 17/437,043, filed on Sep. 7, 2021, which is based upon and claims the benefit of priority from Japanese patent application No. 2019-079077, filed on Apr. 18, 2019, the disclosures of both of which are incorporated herein in their entireties by reference.

TECHNICAL FIELD

The present invention can be suitably applied to a stretching apparatus configured to stretch a film in a longitudinal direction and a transverse direction.

BACKGROUND ART

In the stretching apparatus, longitudinal stretching and transverse stretching can be performed, and performing these in series is referred to as a sequential biaxial stretching method, and performing these at once is referred to as a simultaneous biaxial stretching method. As compared with the sequential stretching method, the simultaneous biaxial stretching method has such advantages that scratches are less likely to occur, an application range of raw materials is wide and films can be stretched even at a high crystallization rate, and longitudinal and transverse uniformity of physical properties are high.

For example, Patent Document 1 (Japanese Unexamined Patent Application Publication No. 2004-155138) discloses a stretching machine of a sheet-like material, in which endless link devices each composed of a plurality of equal-length links formed like a folding scale and arranged on both sides of a sheet-like material are driven by sprockets on an inlet side and an outlet side of the sheet-like material, and are guided by guide rails formed of guides arranged to be divergent in the thereby stretching the sheet-like moving direction, material in a transverse direction.

RELATED ART DOCUMENTS

Patent Documents

Patent Document 1: Japanese Unexamined Patent Application Publication No. 2004-155138

SUMMARY OF THE INVENTION

Problems to be Solved by the Invention

The stretching apparatus configured to stretch a film includes a plurality of links coupled to form an endless chain. For example, when performing the replacement work of the plurality of links at the time of maintenance, there is room for improvement from the viewpoint of work efficiency.

The other problems and novel features will be apparent from the description of this specification and the accompanying drawings.

Means for Solving the Problems

A film stretching apparatus disclosed in this application includes: a pair of link devices configured to be able to carry and stretch a film and each composed of a plurality of links coupled to form an endless chain; a heat treatment unit configured to cover a central portion of the pair of link devices and perform a heat treatment to the film; a first link drive mechanism arranged outside the heat treatment unit and on an inlet side of the film and configured to drive the plurality of links; a second link drive mechanism arranged outside the heat treatment unit and on an outlet side of the film and configured to drive the plurality of links; and a link adjustment mechanism arranged outside the heat treatment unit and on the outlet side of the film and configured to reduce a pitch of the plurality of links.

Effects of the Invention

According to the stretching apparatus disclosed in this application, it is possible to efficiently replace the plurality of links.

BRIEF DESCRIPTIONS OF THE DRAWINGS

FIG. 11 is an enlarged plan view of an outlet side of one of the pair of link devices shown in FIG. 2; and FIG. 12 is an enlarged plan view showing a modification of the link adjustment mechanism shown in FIG. 11.

DETAILED DESCRIPTION OF PREFERRED EMBODIMENTS

Figure 1:
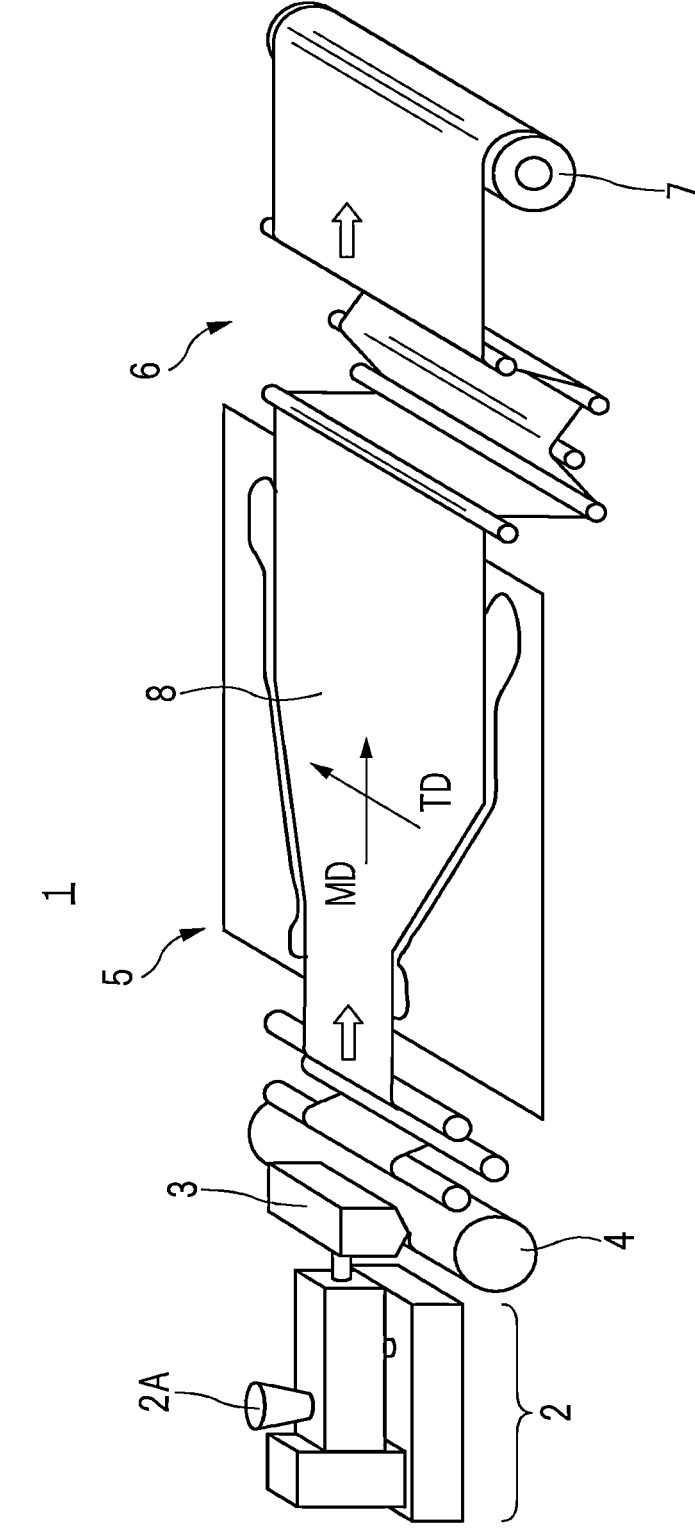
FIG. 1 is a schematic diagram showing a configuration of a thin-film manufacturing system according to an embodiment.

Hereinafter, embodiments will be described in detail based on examples and drawings. Note that components having the same function are denoted by the same reference characters in all of the drawings for describing the embodiments, and the repetitive description thereof will be omitted.
<Overall Configuration>
FIG. 1 is a schematic diagram showing a configuration of a thin-film manufacturing system according to the present embodiment. A thin-film manufacturing system according to the present embodiment shown in FIG. 1 includes a kneading extrusion apparatus (biaxial kneading extrusion apparatus) 2, a T-die 3, a raw sheet cooling apparatus 4, a stretching apparatus (simultaneous biaxial stretching apparatus) 5, a take-off apparatus 6, and a winder apparatus 7. In the example shown in FIG. 1, first, a resin material (pellet), an additive, and the like are supplied to a raw material supply unit 2A of the kneading extrusion apparatus 2. The biaxial kneading extrusion apparatus 2 transports (conveys) the supplied resin material and the like while mixing them. The T-die 3 extrudes the kneaded material (molten resin) kneaded by the biaxial kneading extrusion apparatus 2 from a slit. The kneaded material extruded from the T-die 3 is cooled by the raw sheet cooling apparatus 4 to become a film (sheet, resin film) 8. The film formed by the T-die 3 is continuously supplied to the stretching apparatus 5. For the stretching apparatus 5, the film 8 corresponds to the raw material to be stretched. In this specification, since the stretching apparatus 5 will be mainly described, the sheet-like material supplied to the stretching apparatus 5 and the film 8 before the stretching treatment are referred to as a raw sheet in some cases. On the other hand, the film 8 discharged from the stretching apparatus 5 after the stretching treatment is completed is referred to as a thin film in some cases.

The film 8 cooled by the raw sheet cooling apparatus 4 is stretched in an MD direction and a TD direction by the stretching apparatus 5 to be a thin film. The stretched film 8 is wound by the winder apparatus 7 via the take-off apparatus 6.

In the case of the thin-film manufacturing system 1 shown in FIG. 1 as an example, a thin film is manufactured as described above. The thin-film manufacturing system 1 shown in FIG. 1 can be variously modified in accordance with the characteristics of the thin film to be formed. For example, in addition to the configuration shown in FIG. 1, an extraction tank (not shown) may be provided near the take-off apparatus 6 shown in FIG. 1, and the plasticizer (for example, paraffin) in the film 8 may be removed in the extraction tank.

The stretching apparatus 5 according to the present embodiment stretches the thin film in the MD direction and the TD direction while conveying the film 8 in the MD direction. The MD (Machine Direction) direction is the conveying direction of the thin film, and is referred to also as a longitudinal direction. Further, the TD (Transverse Direction) direction is the direction that intersects the conveying direction of the thin film, and is referred to also as a lateral direction. The stretching apparatus 5 capable of simultaneously stretching the film in two directions intersecting each other is referred to as a simultaneous biaxial stretching apparatus.

Figure 2:
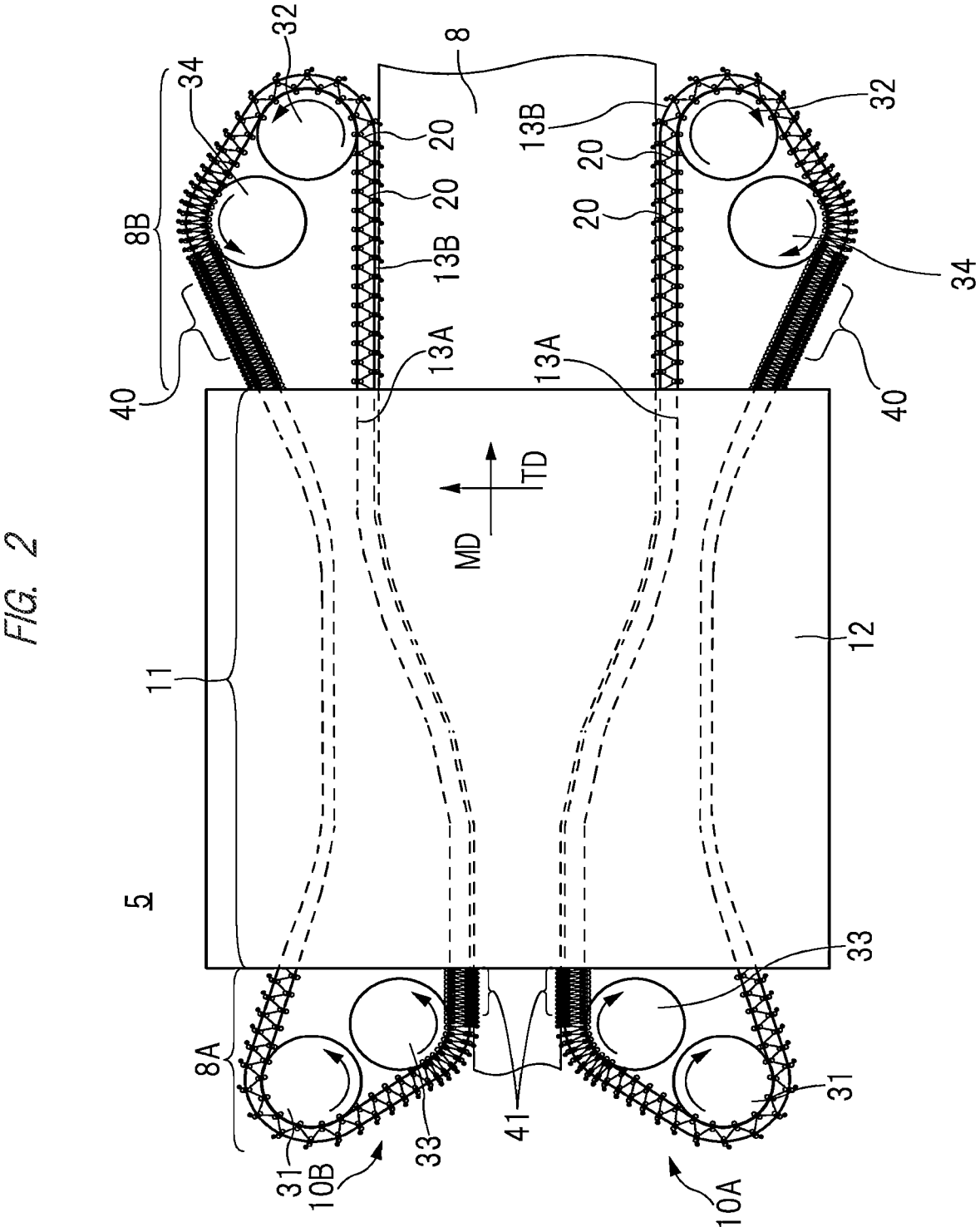
FIG. 2 is a plan view showing an example of the structure of the stretching apparatus shown in FIG. 1.
Figure 3:
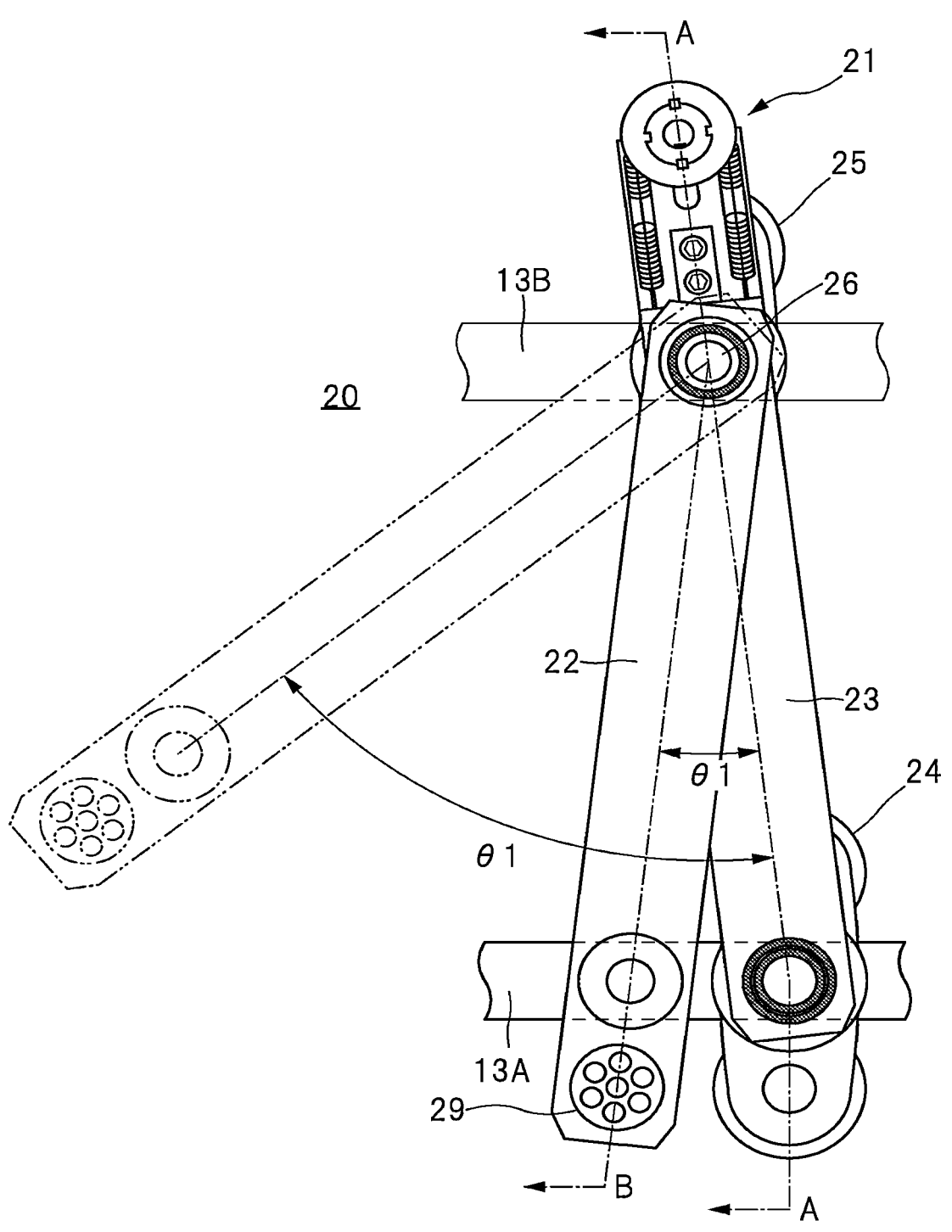
FIG. 3 is an enlarged plan view showing one of the plurality of links shown in FIG. 2 in an enlarged manner.
Figure 4:
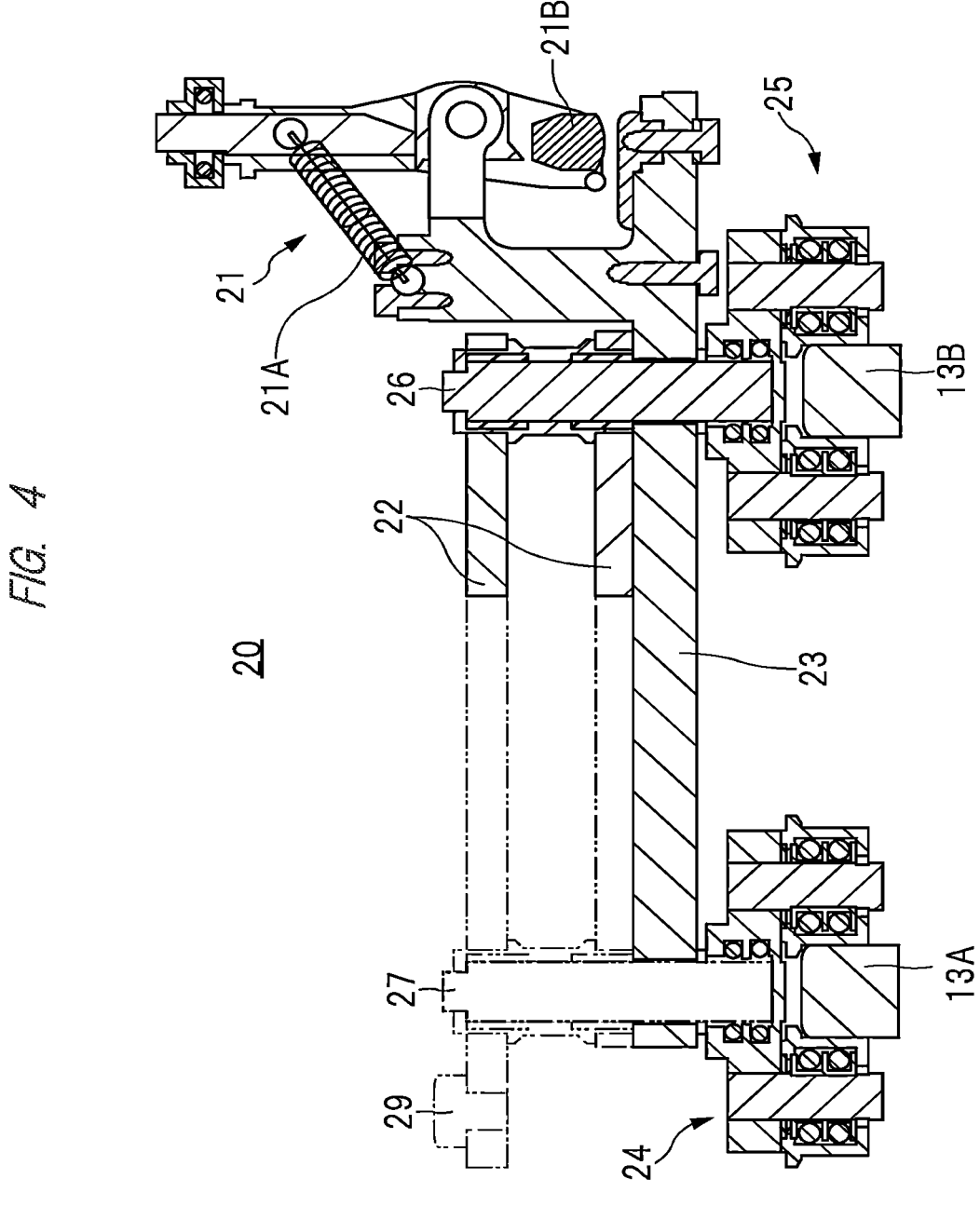
FIG. 4 is a cross-sectional view of the link shown in FIG. 3 taken along a line A-A.
Figure 5:
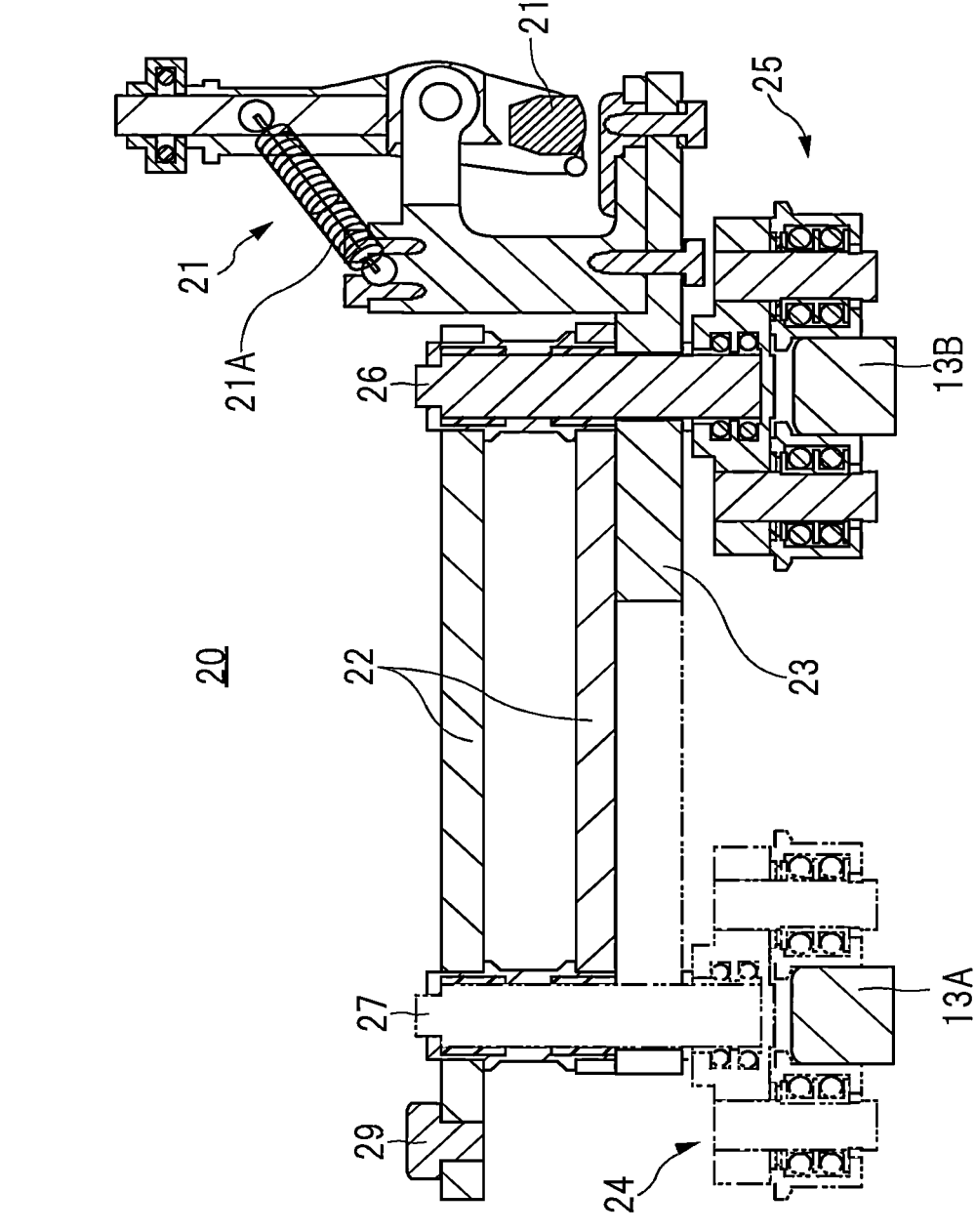
FIG. 5 is a cross-sectional view of the link shown in FIG. 3 taken along a line A-B.

Hereinafter, the structure of the stretching apparatus 5 and the principle of the stretching of the film 8 in the MD direction and the TD direction by the stretching apparatus 5 will be described. FIG. 2 is a plan view showing an example of the structure of the stretching apparatus shown in FIG. 1. In an oven shown in FIG. 2, a plurality of links 20 arranged on rails 13A and 13B is arranged, but only the outlines of the rails 13A and 13B and the film 8 are shown by dotted lines in FIG. 2. FIG. 3 is an enlarged plan view showing one of the plurality of links shown in FIG. 2 in an enlarged manner. FIG. 4 is a cross-sectional view of the link shown in FIG. 3 taken along a line A-A. FIG. 5 is a cross-sectional view of the link shown in FIG. 3 taken along a line A-B. In FIG. 4 and FIG. 5, in order to make a support structure of a clip 21 easy to see, members located at positions different from the cross sections along the lines A-A and A-B shown in FIG. 3 are shown in white.

As shown in FIG. 2, the stretching apparatus 5 includes a pair of link devices 10A and 10B arranged apart from each other in a plan view. The film 8 is arranged between the link device 10A and the link device 10B, and is conveyed in the MD direction. The portion between the link device 10A and the link device 10B functions as a conveyor unit for conveying the film 8. The stretching apparatus 5 includes a heat treatment unit 12 that covers the central portions of the pair of link devices 10A and 10B and functions to perform the heat treatment to the film 8. In the example shown in FIG. 2, an example of heat treatment using an oven is shown as a heat treatment method. Each portion (central portion 11) of the link devices 10A and 10B is arranged inside the heat treatment unit 12. In the following description in this specification, in each of the link devices 10A and 10B arranged so as to penetrate the oven which is the heat treatment unit 12, the portion arranged inside the heat treatment unit 12 will be described as a central portion 11. The film 8 passes through the heat treatment unit 12 while being held by the link devices 10A and 10B.

Each of the link devices 10A and 10B has a plurality of links 20 coupled so as to form an endless chain. A clip 21 (see FIG. 3), which is a jig for gripping the film 8, is attached to each of the plurality of links 20. The film 8 is gripped by the plurality of links 20 via the clips 21.

The plurality of links 20 coupled to each other is mounted on the rails 13A and 13B so as to be able to move along the rails 13A and 13B. Each of the link devices 10A and 10B has a pair of rails 13A and 13B. Of the pair of rails 13A and 13B, the rail 13A is arranged on the inner peripheral side, and the rail 13B is arranged on the outer peripheral side. Note that the rail 13A is referred to as an inner rail and the rail 13B is referred to as an outer rail in some cases.

As shown in FIG. 2, the pair of rails 13A and 13B provided in each of the link devices 10A and 10B are annularly formed across the inlet side (inlet portion) 8A of the film 8, the heat treatment unit 12, and the outlet side (outlet portion) 8B of the film 8. Each of the pair of link devices 10A and 10B has a film side facing the film 8 and a return side located opposite to the film side. In the following description, the side on which the plurality of links 20 is conveyed from the inlet side 8A to the outlet side 8B while the film 8 is gripped by the clips 21 is referred to as the "film side". On the other hand, the side which is located opposite to the film side and on which the clips 21 do not grip the film 8 and the plurality of links 20 is conveyed from the outlet side 8B to the inlet side 8A is referred to as the "return side".

The endless chain composed of the plurality of links 20 is driven by a link drive mechanism arranged outside the heat treatment unit 12. In the example shown in FIG. 2, the stretching apparatus 5 has a link drive mechanism on each of the inlet side 8A and the outlet side 8B of the film 8. A sprocket 31 which is a first link drive mechanism is arranged on the inlet side 8A of the film 8. A sprocket 32 which is a second link drive mechanism is arranged on the outlet side 8B of the film 8. The sprockets 31 and 32 respectively engage with the plurality of links 20 and rotate so as to advance the plurality of links 20 in the MD direction. Each of the plurality of links 20 moves on the rail 13A and the rail 13B by the driving force of the rotation operation of the sprockets 31 and 32.

The pitch between the adjacent links 20 (sometimes referred to as the link pitch) of the plurality of links 20 can be changed in accordance with the separation distance between the rail 13A and the rail 13B. In other words, the pitch of the adjacent links 20 can be adjusted by adjusting the separation distance between the rail 13A and the rail 13B. Specifically, in the region where the separation distance between the rails 13A and 13B is large, the pitch of the adjacent links 20 is smaller as compared with the region where the separation distance between the rails 13A and 13B is small.

The plurality of links 20 is arranged on the rails in the state where the pitches of the adjacent links 20 can be changed. Further, the clip 21 (see FIG. 3) is attached to one end portion of each of the plurality of links in the state where the pitch (distance between centers) of the adjacent clips 21 can be changed. The film 8 is stretched in the TD direction in the heat treatment unit 12 in a region where the separation distance between the rail 13B of the link device 10A and the rail 13B of the link device 10B gradually increases. The stretching apparatus 5 includes region (MD-direction stretching region) in which the link pitch of the plurality of links 20 provided in the link device 10A and the link pitch of the plurality of links 20 provided in the link device 10B become large, in the heat treatment unit 12. The film 8 is stretched in the MD direction in the region where the link pitches become large. In the region where the link pitches become large, the separation distance between the rail 13A and the rail 13B becomes small in each of the link devices 10A and 10B. Since the region where the separation distance between the rail 13B of the link device 10A and the rail 13B of the link device 10B gradually increases and the region where the link pitches become large are the same region, the film 8 is simultaneously stretched in the TD direction and the MD direction in this region.

Further, since the link pitches become large in the heat treatment unit 12 in the stretching apparatus 5, it is necessary to make the link pitches small on the inlet side 8A to the heat treatment unit 12. Therefore, the stretching apparatus 5 includes sprockets 33 that are located outside the heat treatment unit 12 and are arranged on the inlet side 8A of the film 8. The sprocket 33 rotates at a rotation speed slower than the rotation speed of the sprocket 31. The sprocket 33 engages with the plurality of links 20. By arranging the sprocket 33 that rotates at a rotation speed slower than the rotation speed of the sprocket 31 on the inlet side 8A of the film 8, the link pitch of the plurality of links 20 becomes smaller in the region in which the links engage with the sprocket 33. The sprocket 33 functions as a link adjustment mechanism unit for reducing the link pitch of the plurality of links 20.

Also, the stretching apparatus 5 includes sprockets 34 arranged on the outlet side 8B of the film 8 in addition to the sprockets 33. The sprockets 34 are located outside the heat treatment unit 12 and are arranged on the outlet side 8B of the film 8. The sprocket 34 functions as a link adjustment mechanism unit for reducing the link pitch of the plurality of links 20 on the outlet side 8B of the film 8. The effect obtained by providing the sprockets 34 will be described later.

The film 8 is gripped by the clips 21 attached to the links 20 provided in each of the link devices 10A and 10B on the inlet side 8A to the heat treatment unit 12. The clip 21 is configured to open and close by moving a grip portion 21B (see FIG. 4 and FIG. 5) up and down by a force of a spring 21A or the like shown in FIG. 3 to FIG. 5. The clips 21 are conveyed in the MD direction together with the links 20 while gripping the end portion of the film 8. The film 8 is heated in the heat treatment unit 12 and is stretched in the MD direction and the TD direction along with the movement of the clips 21. The stretched film 8 is conveyed toward the outlet side 8B of the heat treatment unit 12 in a state of being gripped by the clips 21. The film 8 is released from the clips 21 outside the heat treatment unit 12 and on the outlet side 8B of the film 8. The take-off apparatus 6 and the winder apparatus 7 shown in FIG. 1 are arranged anterior to the outlet side of the film 8, and the stretched film 8 is wound and collected by the winder apparatus 7.

Next, the structure of the link 20 will be described. As shown in FIG. 3, the link 20 includes an upper link plate 22, a lower link plate 23, and rail holders 24 and 25. Each of the upper link plate 22 and the lower link plate 23 is a plate-shaped member that extends linearly in a plan view. A shaft 26 is inserted into one end portion of the upper link plate 22. As shown in FIG. 4 and FIG. 5, the shaft 26 is inserted also into the lower link plate 23, and the upper link plate 22 and the lower link plate 23 are coupled via the shaft 26 in a state of being rotatable around the center of the shaft 26 as a rotation axis. The clip 21 is attached to one end portion of the lower link plate 23. As shown in FIG. 4, in the lower link plate 23, the shaft 26 is inserted between one end portion to which the clip 21 is attached and the other end portion. In FIG. 3, a state in which the upper link plate 22 and the lower link plate 23 rotate around the shaft 26 is schematically shown by using two-dot chain lines. When the upper link plate 22 and the lower link plate 23 rotate around the shaft 26 as a rotation axis, an angle θ1 formed by the upper link plate 22 and the lower link plate 23 changes.

In this specification, increasing each angle θ1 shown in FIG. 3 is referred to as "open of the link", and decreasing the angle θ1 is referred to as "close of the link" in some cases. Also, the operation of increasing or decreasing the angle θ1 is referred to as "link opening/closing operation" in some cases.

Further, as shown by two-dot chain lines in FIG. 4 and FIG. 5, a shaft 27 is inserted into the upper link plate 22. The shaft 27 is a coupling member that couples the links 20 adjacent to each other. The shaft 27 is inserted into the upper link plate 22 of one of the adjacent links 20 and the lower link plate 23 of the other of the adjacent links 20. The upper link plate 22 of one link 20 and the lower link plate 23 of the other link 20 are coupled via the shaft 27 in a state of being rotatable around the center of the shaft 27 as a rotation axis. As shown in FIG. 5, an engaging portion 29 that engages with the sprockets 31, 32, 33, and 34 shown in FIG. 2 is attached to the other end portion of the upper link plate 22. In the upper link plate 22, the shaft 27 is inserted between the engaging portion 29 and the shaft 26. When the upper link plate 22 and the lower link plate 23 rotate around the shaft 27 as a rotation axis, the angle formed by the upper link plate 22 of one link 20 and the lower link plate 23 of the other link 20 changes (not shown).

As shown in FIG. 4 and FIG. 5, the rail holder 25 is attached to the lower end of the shaft 26. The rail holder 25 is attached in a state of being rotatable around the center of the shaft 26 as a rotation axis. As shown in FIG. 4, the rail holder 24 is attached to the lower end of the shaft 27. The rail holder 24 is attached in a state of being rotatable around the center of the shaft 27 as a rotation axis. The rail holder 24 is arranged so as to cover the rail 13A, and the rail holder 25 is arranged so as to cover the rail 13B.

Since the link 20 has the structure described above, when the separation distance between the rail 13A and the rail 13B changes, the upper link plate 22 and the lower link plate 23 rotate following the change. As a result, the pitch of the adjacent links 20 changes in accordance with the separation distance between the rail 13A and the rail 13B. The pitch of the adjacent links 20 can be defined with reference to the apex of the portion configured to be rotatable, in other words, the center of the shaft 26. Namely, the pitch of the adjacent links 20 is defined as the distance between the centers of the shafts 26 provided in the adjacent links 20.

<Link Replacement Method>

Figure 6:
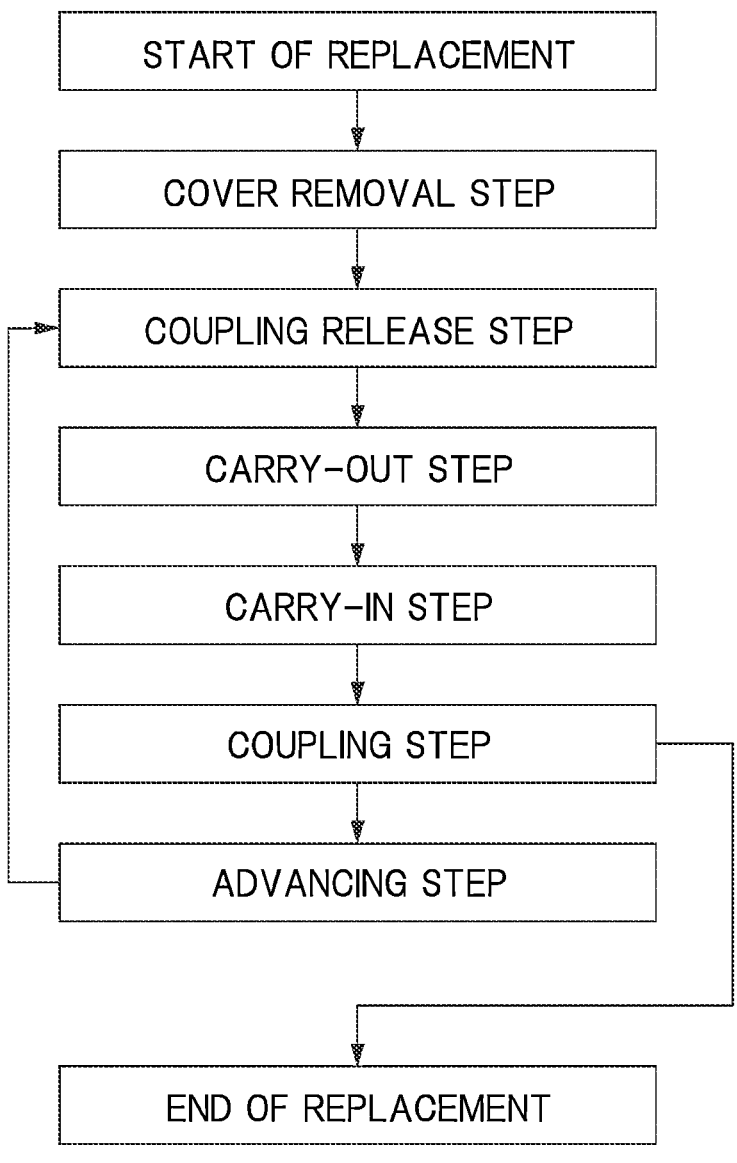
FIG. 6 is a flowchart showing an outline of the process flow of the link replacement method of the stretching apparatus according to the present embodiment.

Next, a method of replacing the plurality of links 20 provided in the stretching apparatus 5 shown in FIG. 2 will be described. FIG. 6 is a flowchart showing an outline of the process flow of the link replacement method of the stretching apparatus according to the present embodiment. Hereinafter, the link replacement method will be described in order along the flow shown in FIG. 6.

The stretching apparatus 5 described with reference to FIG. 2 to FIG. 5 is provided with the link 20 to which the clip 21 (see FIG. 3 to FIG. 5) for gripping the film 8 (see FIG. 2) is fixed. By annularly driving the plurality of links 20 coupled in a state where the link pitches thereof are variable, the film 8 can be simultaneously stretched in two directions intersecting each other. In order to actuate the stretching apparatus 5 stably, regular maintenance of the components of the stretching apparatus 5 is necessary. In particular, the link 20 includes many movable parts, and the proper operation of the movable parts of the link 20 significantly affects the quality of the stretched film 8. Further, since the link 20 is repeatedly heated by passing through the inside of the heat treatment unit 12, the replacement of the wear-out parts and others is indispensable. Therefore, from the viewpoint of stable operation of the stretching apparatus 5, it is necessary to regularly replace a large number of links 20 to maintain the state in which the links 20 operate as designed.

However, the number of links 20 provided in one stretching apparatus 5 exceeds 1000. For example, each of the link devices 10A and 10B shown in FIG. 2 includes about 700 to 800 links 20. Therefore, it takes too much time to replace if the links 20 are replaced one by one. Therefore, in order to improve work efficiency, it is preferable to replace the plurality of links 20 at once.

For example, in the embodiment described below, the method in which ten (sometimes referred to as ten pieces) links 20 coupled to each other are set as one group and the replacement work is performed for each group will be described. The weight of one group in which ten links 20 are coupled is about 40 kg. Therefore, in consideration of the relationship between workability and work time, the number of links 20 included in one group is set to ten. However, the number of links included in one group is not strictly limited to ten. The number of links 20 may be more than 10 as long as the workability of the replacement work is not impaired. Further, for example, even when one group is composed of less than ten links 20, the working time can be shortened as compared with the case of replacing the links one by one.

(Cover Removal Step)

First, as a cover removal step shown in FIG. 6, among the covers which cover each of the link devices 10A and 10B, the cover which covers the link replacement region (first region) 40 (see FIG. 2) corresponding to the working region of the link replacement work is removed to expose the plurality of links 20 in the link replacement region 40. Although not shown in FIG. 2, each of the plurality of links 20 is covered with covers of the link devices 10A and 10B on the inlet side 8A and the outlet side 8B of the film 8, respectively.

In the case of the present embodiment, the link replacement region 40 is provided outside the heat treatment unit 12 and on the return side of the outlet side 8B. Further, the link replacement region 40 is provided between the sprocket 34 and the heat treatment unit 12 on the return side of the outlet side 8B. As a comparative example corresponding to the present embodiment, the inventors of the present application have studied a method of performing the link replacement work in a region 41 located on the film side of the inlet side 8A shown in FIG. 2. In the case of the region 41, since the separation distance between the link device 10A and the link device 10B is small and the apparatus for supplying the film 8 to the stretching apparatus 5 shown in FIG. 1 is arranged, it is difficult to secure a work space. For example, as shown in FIG. 2, the separation distance between the link device 10A and the link device 10B is smaller on the inlet side 8A of the film 8 than on the outlet side 8B of the film 8. Even if the replacement work is possible, the work efficiency is low because the work needs to be performed in a limited space.

On the other hand, since the link replacement region 40 according to the present embodiment is arranged on the return side, there is less interference with other apparatuses when performing the link replacement work as compared with the region 41. Therefore, a large work space can be secured. For example, when the ten links 20 coupled to each other are replaced at once, it is preferable that there is a large space for taking out the used links 20 and carrying in the replacement links 20. According to the present embodiment, since the degree of freedom in handling the used links 20 or the replacement links 20 is high, the work can be performed efficiently.

(Coupling Release Step)

Figure 7:
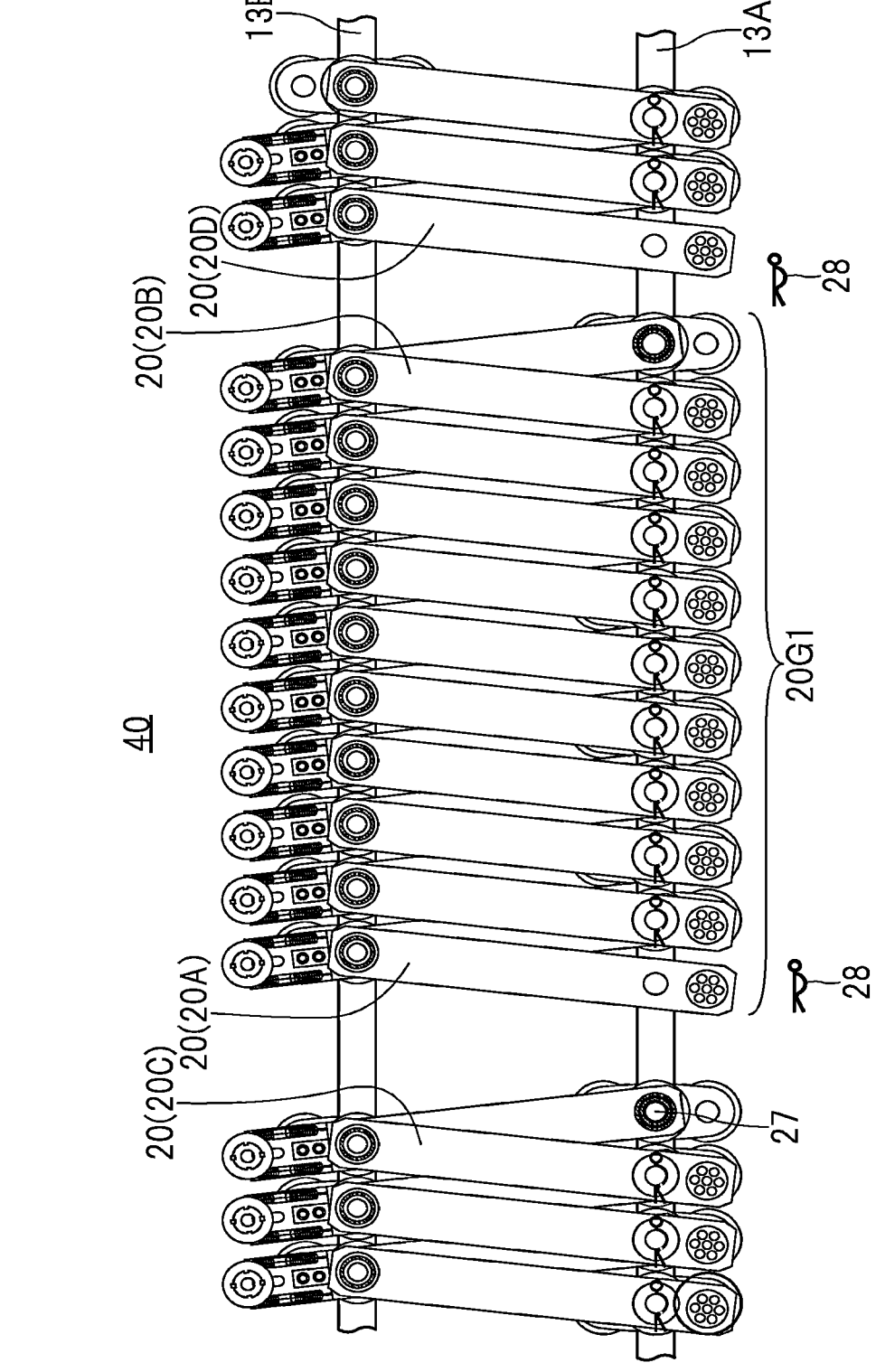
FIG. 7 is a plan view showing the state where coupling of some of the plurality of links is released in the link replacement region shown in FIG. 2.

Next, as a coupling release step shown in FIG. 6, the coupling states of some of the plurality of links 20 coupled to each other are released in the link replacement region 40 as shown in FIG. 7. FIG. 7 is a plan view showing the state where coupling of some of the plurality of links is released in the link replacement region shown in FIG. 2. Of the link devices 10A and 10B shown in FIG. 2, an enlarged view of the link replacement region 40 of the link device 10A (see FIG. 2) is shown in FIG. 7. Since the work in the link replacement region 40 of the link device 10B is the same as the work in the link replacement region 40 of the link device 10A, the illustration thereof is omitted. Similarly, the replacement work in the link device 10A for each of the steps shown in FIG. 6 relative to the description of the link replacement method will be described as an example.

Each of the plurality of links 20 is coupled via the shaft 27, and the coupling portion is fixed by inserting a pin 28 into the upper end portion of the shaft 27. In this step, in a take-out link group 20G1 composed of ten links 20, the pin 28 of the link 20A located at the beginning in the moving direction and the pin 28 of the link 20B located at the end in the moving direction are removed from the shafts 27. Next, the upper link plate 22 (see FIG. 4) of the link 20A at the beginning is removed from the shaft 27 inserted into the lower link plate 23 (see FIG. 4) of the link 20C located anterior in the moving direction. As a result, the take-out link group 20G1 is separated from the link 20C located anterior in the moving direction. Also, the upper link plate 22 of a link 20D located behind the take-out link group 20G1 is removed from the shaft 27 inserted into the lower link plate 23 of the link 20B located at the end in the moving direction. As a result, the take-out link group 20G1 is separated from the link 20D located behind in the moving direction.

(Carry-Out Step)

Figure 8:
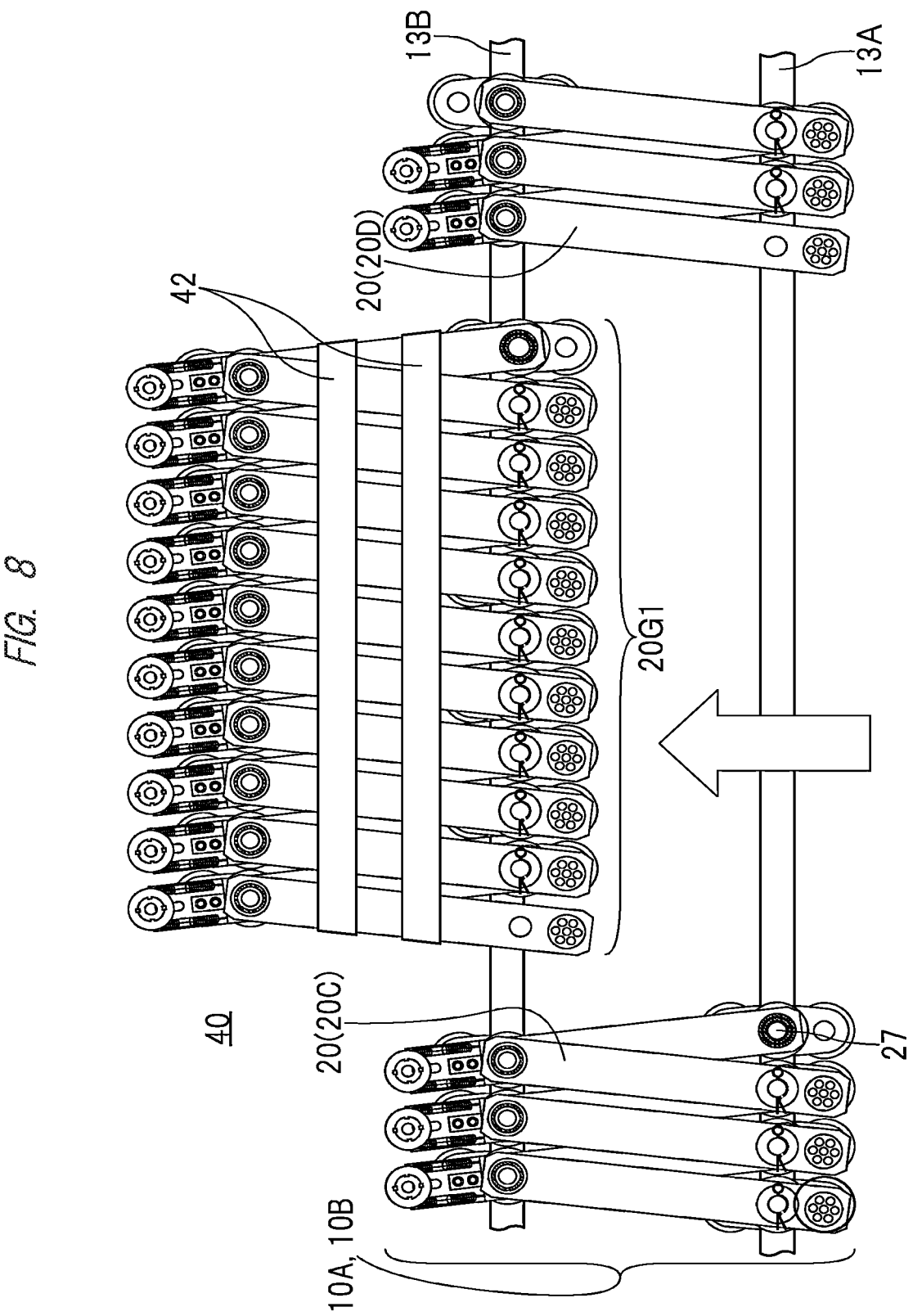
FIG. 8 is a plan view schematically showing the state where the take-out link group shown in FIG. 7 is bound and carried out from rails.

Next, as a carry-out step shown in FIG. 6, the take-out link group 20G1 bound into a bundle is carried out from the rails as shown in FIG. 8. FIG. 8 is a plan view schematically showing the state where the take-out link group shown in FIG. 7 is bound and carried out from the rails.

In this step, the take-out link group 20G1 is bound by a band 42 made of, for example, a string. FIG. 8 shows an example in which the take-out link group 20G1 is bound by two bands 42, but various modifications are applicable to the binding method. As described above, the plurality of links is coupled in the state where the link pitch can be freely changed. Therefore, if the take-out link group 20G1 is removed from the rails in an unbound state, the individual links 20 open and close freely due to the balance of gravity. Therefore, in the present embodiment, the opening/closing operation of the links 20 during the carry is restricted by binding the take-out link group 20G1.

When binding the take-out link group 20G1, it is preferable that the angle θ1 formed by the upper link plate 22 and the lower link plate 23 shown in FIG. 3 is the smallest. In other words, it is preferable that the separation distance between the rail 13A and the rail 13B is the largest among all the regions. When the angle θ1 is the smallest, the upper link plate 22 and the lower link plate 23 of the link 20 are in a closed state. In this case, the plurality of links 20 can be bound tightly even if the binding work is performed on the rails 13A and 13B. As a result, the take-out link group 20G1 can be carried out in the state where the degree of freedom of opening/closing operation of the take-out link group 20G1 is restricted.

In the case of the present embodiment, on the return side of the pair of link devices 10A and 10B shown in FIG. 2, the separation distance between the rail 13A and the rail 13B in the link replacement region (first region) 40 between the sprocket 34 functioning as the link adjustment mechanism and the heat treatment unit 12 is the largest in the overall link devices 10A and 10B. Specifically, the separation distance between the rail 13A and the rail 13B in the link replacement region 40 is equal to the separation distance between the rail 13A and the rail 13B in the region (second region) 41 between the sprocket 33 and the heat treatment unit 12 on the film side. Each of the link replacement region 40 and the region 41 is the region designed such that the pitch of the adjacent links 20 is the smallest among the regions of the link devices 10A and 10B.

Then, as schematically shown by an arrow in FIG. 8, the bound take-out link group 20G1 is carried out of the link devices 10A and 10B (see FIG. 2). Although not shown in FIG. 8, when lifting the take-out link group 20G1 from the rails 13A and 13B, a lifting device (not shown) such as a chain block may be used. As described above, since a large work space can be secured around the link replacement region of the present embodiment, even a large lifting device can be used.

The take-out link group 20G1 that has been carried out is subjected to an inspection of a worn state, disassembled, repaired, or replaced as necessary.

By the way, when the replacement work of the link 20 is performed in the region 41, the sprocket 34 and the link replacement region 40 shown in FIG. 2 are unnecessary. In this case, the mechanism to reduce the link pitch is not provided on the return side of the link devices 10A and 10B, and the coupled links 20 may be driven to the inlet side 8A of the film 8 in the state where the link pitch is large. In this case, the total number of links 20 can be reduced as compared with the present embodiment. However, since various devices are densely arranged in the region 41, it is difficult to secure a space for performing the take-out work of the take-out link group 20G1 shown in FIG. 8. Therefore, in the present embodiment, though the total number of links 20 increases, the link replacement region 40 is provided on the return side and on the outlet side 8B of the film 8 because the work efficiency can be improved. Accordingly, even though the total number of links 20 to be replaced increases, the efficiency of the replacement work is improved as a result.

Further, even on the return side, providing the link replacement region 40 on the inlet side 8A of the film 8 causes the following problem. That is, when the link pitch is small, it is difficult to drive the links 20 from the return side to the film side by the use of the sprocket 31. Therefore, in order to provide the link replacement region 40 on the inlet side 8A of the film 8, a mechanism for increasing the link pitch (for example, another sprocket or space for laying the rails (not shown)) needs to be provided between the link replacement region 40 and the sprocket 31.

On the other hand, when the link replacement region 40 is provided on the outlet side 8B of the film 8 as shown in FIG. 2, the link pitch can be increased by reducing the separation distance between the rail 13A and the rail 13B in the path of conveying the links 20 from the outlet side 8B to the inlet side 8A. Therefore, it is considered that the return side on the outlet side 8B, which is a place where it is possible to secure a work space in which the link replacement work can be efficiently performed while suppressing the increase in size of the stretching apparatus 5, is the optimum place as the link replacement region 40.

(Carry-In Step)

Figure 9:
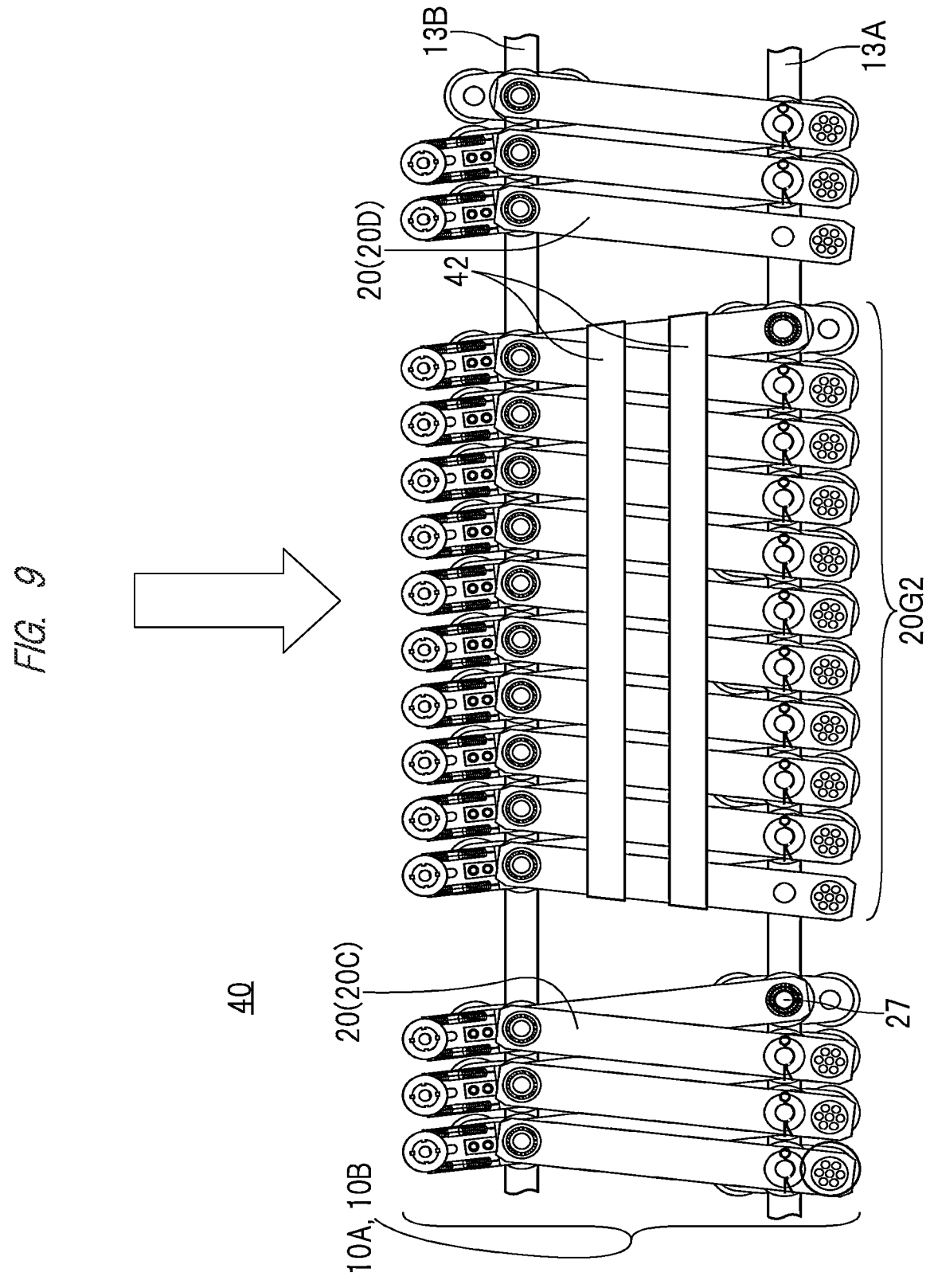
FIG. 9 is a plan view schematically showing the state where a replacement link group is carried onto the rails in the link replacement region shown in FIG. 8.

Next, as a carry-in step shown in FIG. 6, as shown in FIG. 9, a bound replacement link group 20G2 is carried in from the outside above the rails and arranged on the rails 13A and 13B of the link device. FIG. 9 is a plan view schematically showing the state where the replacement link group is carried onto the rails in the link replacement region shown in FIG. 8.

The replacement link group 20G2 carried in in this step is composed of ten links 20 as many as the take-out link group 20G1 carried out in the carry-out step described with reference to FIG. 8. The replacement link group 20G2 is bound by the band 42 made of a string or the like. As is the carry-out step described with reference to FIG. 8, there are various modifications applicable to the binding method. In the case of the replacement link group 20G2, the replacement link group 20G2 needs to be bound for aligning easily the replacement link group 20G2 with the rails 13A and 13B in addition to restricting the opening/closing operation during the carry.

As described with reference to FIG. 4 and FIG. 5, each of the plurality of links 20 includes the rail holders 24 and 25. The rail holder 24 is arranged so as to sandwich the rail 13A, and the rail holder 25 is arranged so as to sandwich the rail 13B. In the case of the present embodiment, ten links 20 are collectively mounted on the rails 13A and 13B. Therefore, in order to easily align the rail holders 24 and 25 with the rails 13A and 13B, it is preferable that the rail 13A and the rail 13B extend in parallel and the opening/closing states of the ten links 20 are easily made uniform in the link replacement region 40. The opening/closing states of the ten links 20 can be easily made uniform when each angle θ1 shown in FIG. 3 is the smallest.

Therefore, in the present embodiment, the replacement link group 20G2 in which a plurality of links 20 is bound into a bundle in advance is prepared, and is mounted on the rails 13A and 13B in the bound state. In the link replacement region 40, as described above, the separation distance between the rail 13A and the rail 13B is the largest among the regions of the link devices 10A and 10B. Therefore, the rail holders 24 and 25 of the replacement link group 20G2 in the bound state and the rails 13A and 13B can be easily aligned.

When only the alignment between the rail holders 24 and 25 and the rails 13A and 13B is taken into consideration, the rail holders and the rails can be aligned even in the state where each angle θ1 shown in FIG. 3 is the largest, in other words, in the state where the separation distance between the rail 13A and the rail 13B is the smallest, and in still other words, in the state where each of the plurality of links 20 is opened to the maximum. However, in the state where the plurality of links 20 is opened to the maximum, the length of the replacement link group 20G2 increases, and it is thus difficult to bind the ten links 20 in that state. Therefore, it is particularly preferable to carry in the plurality of links 20 in the most closed state as in the present embodiment.

(Coupling Step)

Figure 10:
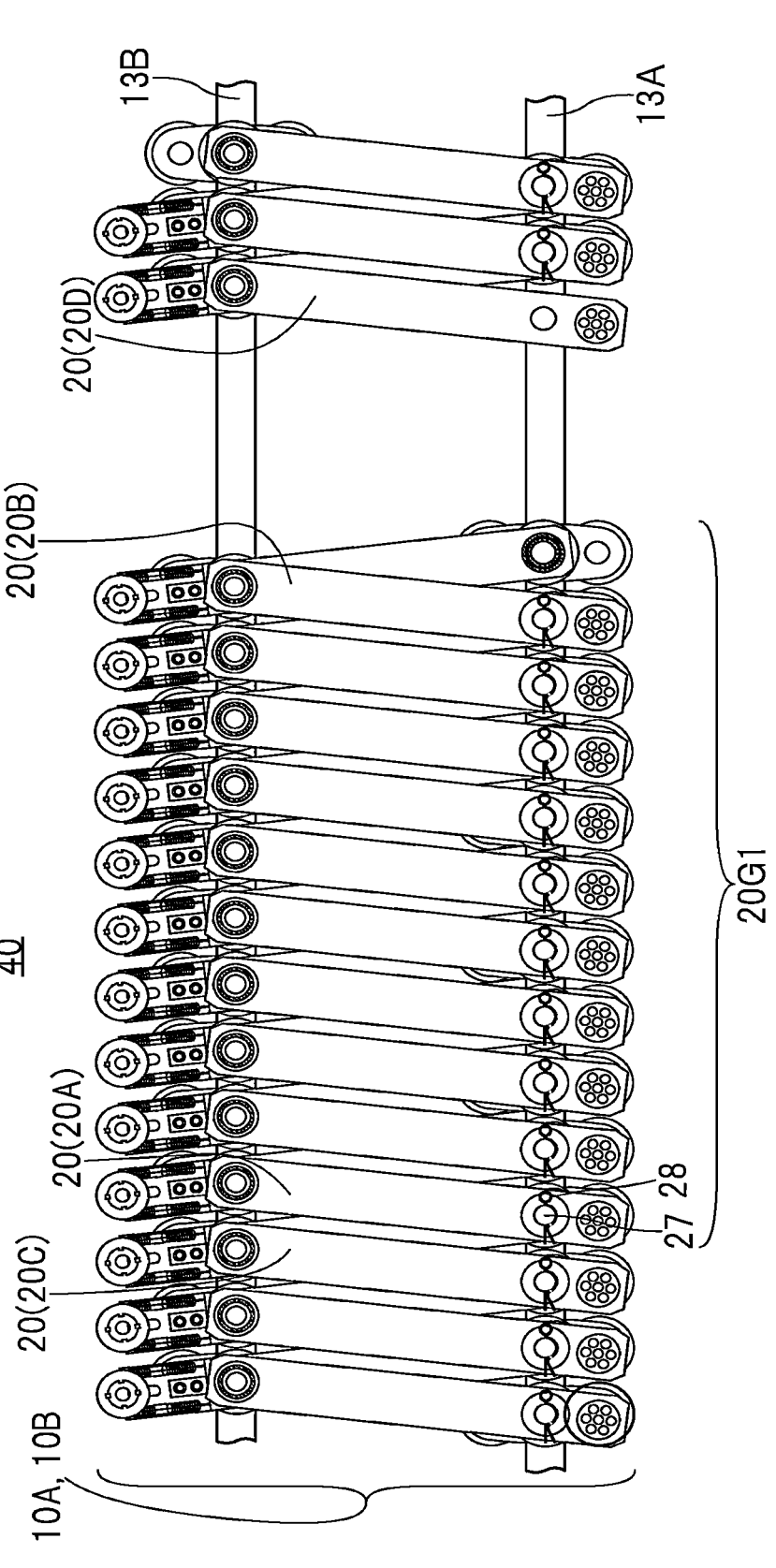
FIG. 10 is a plan view showing the state where the band of the replacement link group shown in FIG. 9 is removed and a link of the link group is coupled to a link anterior to it.

Next, as a coupling step shown in FIG. 6, the binding of the replacement link group 20G2 is released, and the link 20A located at the beginning of the replacement link group 20G2 in the moving direction is coupled to the link 20C located anterior to the link 20A as shown in FIG. 10. FIG. 10 is a plan view showing the state where the band of the replacement link group shown in FIG. 9 is removed and the link is coupled to a link anterior to it.

In this step, the shaft 27 inserted in the lower link plate 23 (see FIG. 4) of the link 20C anterior to the replacement link group 20G2 in the moving direction is inserted into a through hole formed in the upper link plate 22 (see FIG. 4) of the link 20A located at the beginning of the replacement link group 20G2 composed of ten links 20 in the moving direction. Subsequently, a washer plate that prevents the shaft 27 from coming off from the through hole of the upper link plate 22 is inserted and fixed by inserting the pin 28 into the shaped end portion of the shaft 27. In this way, the replacement link group 20G2 is coupled to the link 20C located anterior in the moving direction.

As shown in FIG. 6, in the present embodiment, the steps from the coupling release step to an advancing step are repeatedly performed. Therefore, the link 20B located at the end in the moving direction and the link 20D located behind in the moving direction are not coupled until all the links 20 have been replaced. When all the links 20 have been replaced, a through hole formed in the upper link plate 22 (see FIG. 4) of the link 20D located behind the replacement link group 20G2 in the moving direction is inserted into the shaft 27 inserted in the lower link plate 23 (see FIG. 4) of the link 20B located at the end of the replacement link group 20G2 composed of ten links 20 in the moving direction. Subsequently, a washer plate that prevents the shaft 27 from coming off from the through hole of the upper link plate 22 is inserted and fixed by inserting the pin 28 into the shaped end portion of the shaft 27. In this way, the replacement link group 20G2 is coupled to the link 20D located behind in the moving direction.

(Advancing Step)

Next, as an advancing step shown in FIG. 6, the plurality of links 20 is driven such that the replacement link group 20G2 shown in FIG. 10 is advanced toward the heat treatment unit 12 shown in FIG. 2 and a new take-out link group 20G1 (see FIG. 7) is pushed into the link replacement region 40. In the case of the example shown in FIG. 10, the link 20 located behind the replacement link group 20G2 becomes the link 20A located at the beginning of the next take-out link group 20G1 in the moving direction.

As a method of advancing the plurality of links 20 in the advancing step, for example, a method of advancing them manually is known. Alternatively, as another method, the plurality of links 20 can be advanced by driving each of the sprockets 31 to 34 shown in FIG. 2.

After the advancing step, as shown in FIG. 6, the steps from the coupling release step to the advancing step are repeatedly performed. When all the links 20 provided in the link devices 10A and 10B shown in FIG. 2 have been replaced, the replacement is completed.

<Details of Link Drive>

Figure 11:
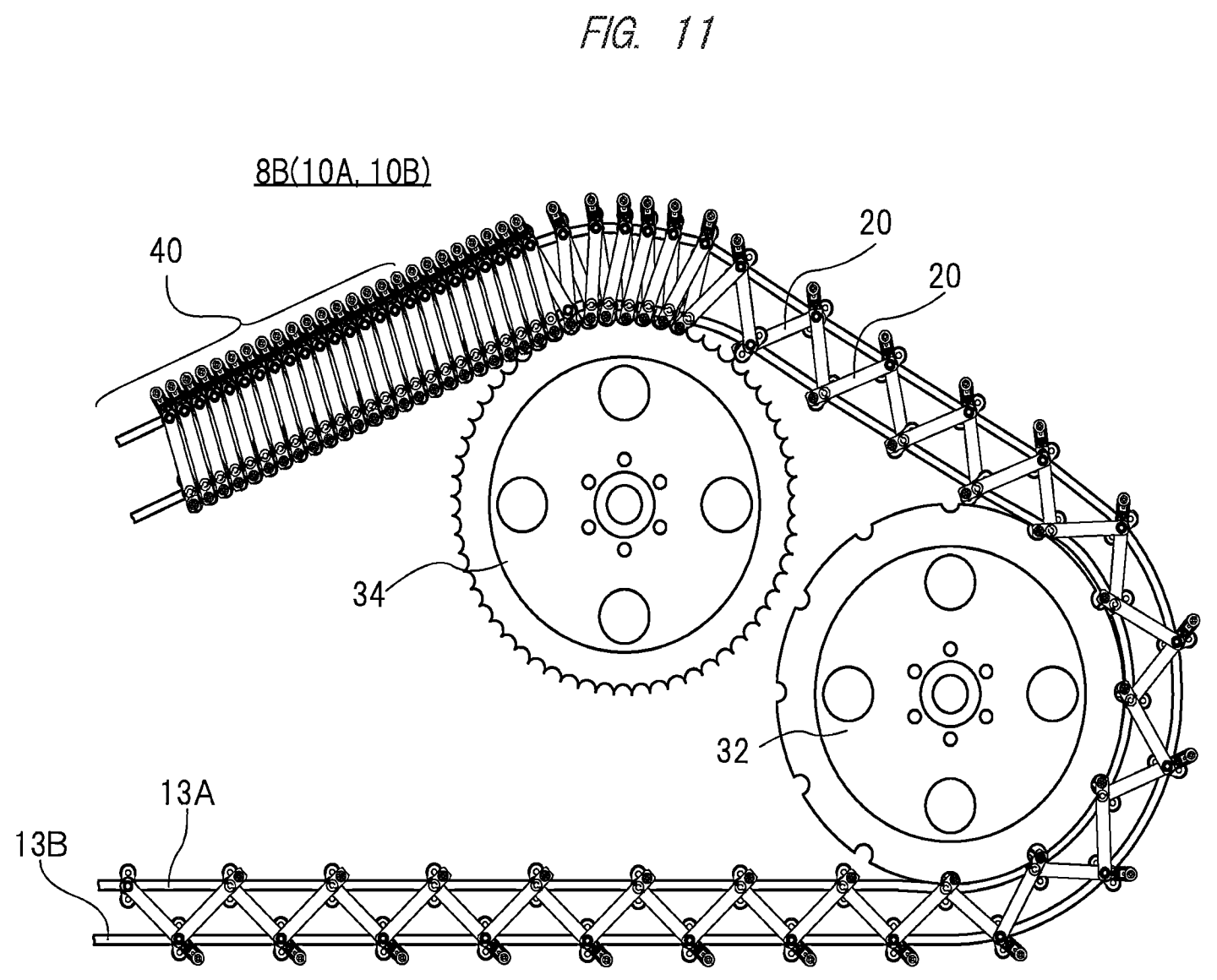

Next, details of the sprocket 32 as the link drive mechanism and the sprocket 34 as the link adjustment mechanism will be described. FIG. 11 is an enlarged plan view of the outlet side of one of the pair of link devices shown in FIG. 2. The sprocket 31 arranged on the inlet side 8A shown in FIG. 2 corresponds to the sprocket 32 on the outlet side 8B, and the sprocket 33 corresponds to the sprocket 34. Since the sprockets 31 and 33 have the same structures and operate in the same manner as the sprockets 32 and 34, the illustration of the sprockets 31 and 33 will be omitted and the sprockets 31 and 33 will be described with reference to FIG. 2 as necessary.

As shown in FIG. 2, in the stretching apparatus 5 according to the present embodiment, the sprockets 31 to 34 are used as the link drive mechanism and the link adjusting mechanism. The sprockets 31 to 34 are gears having a plurality of teeth and are driven by a motor (not shown). Each of the sprockets 31 to 34 is independently driven by a motor, but one motor may be shared by some sprockets in some cases. For example, on the outlet side 8B shown in FIG. 11, the sprockets 32 and 34 may be driven by one motor, or the sprockets 32 and 34 may be driven independently by different motors. When the sprockets 32 and 34 are driven by one motor, it is easy to synchronize the rotation of each sprocket. On the other hand, when the sprockets 32 and 34 are independently driven by different motors, the adjustment margin is large because the rotation speed of each sprocket can be controlled individually.

The sprockets 31 and the sprockets 32 as the link drive mechanisms of the link devices 10A and 10B shown in FIG. 2 define the conveying speed of the film 8. The sprocket 31 rotates so as to advance the plurality of links 20 from the return side to the film side of each of the pair of link devices 10A and 10B. The sprocket 32 rotates so as to advance the plurality of links 20 from the film side to the return side of each of the pair of link devices 10A and 10B. The sprockets 31 and 32 have the same structure as each other. Specifically, the sprockets 31 and 32 have the same rotation diameter (distance from the center of rotation to the tip of the tooth) and the number of teeth. Further, the sprockets 31 and 32 rotate at the same rotation speed.

Also, the sprocket 34 that functions as a link adjustment mechanism for reducing the pitch of the plurality of links 20 is a rotating body that rotates such that the pitch of the plurality of links 20 becomes smaller on the outlet side 8B shown in FIG. 11.

As described above, the pitch of the adjacent links 20 can be reduced by increasing the separation distance between the rails 13A and 13B that face each other. However, if the separation distance between the pair of rails is rapidly changed, the link 20 may not move smoothly on the rails, which may cause troubles such as a part of the links 20 being get stuck in a part of the rails. Therefore, when the rotating body (sprocket 34) that assists the adjustment of the link pitch is not used unlike the present embodiment, it is necessary to take a long distance between the sprocket 32 and the link replacement region 40 so as to gradually reduce the link pitch.

On the other hand, when the sprocket 34 is used as in the present embodiment, the sprocket 34 rotates so as to advance the plurality of links 20 from the outlet side 8B of the film 8 (see FIG. 2) to the inlet side 8A of the film 8 (see FIG. 2). The sprocket 34 rotates at a rotation speed slower than the rotation speed of the sprocket 32. Also, as shown in FIG. 11, the number of teeth of the sprocket 34 is larger than the number of teeth of the sprocket 32. In the example shown in FIG. 11, the number of teeth of the sprocket 34 is about five times as large as the number of teeth of the sprocket 32. The engaging portions 29 (see FIG. 3 and FIG. 4) provided in the plurality of links 20 engage with the recesses between the teeth of the sprocket 34 during the carry. In this region, the separation distance between the rail 13A and the rail 13B increases rapidly. At this time, since the rail 13A arranged on an inner side has a smaller turning radius than the rail 13B arranged on an outer side, the rail holder 24 is likely to be get stuck at the inner portion of the link 20 (around the rail holder 24 shown in FIG. 3 and FIG. 4).

Here, in the case of the present embodiment, the sprocket 34 for reducing the link pitch is arranged in the region where the separation distance between the rail 13A and the rail 13B rapidly increases. The sprocket 34 forcibly advances the engaging portions 29 of the links 20 forward. Also, the speed at which the sprocket 34 advances the links 20 forward is controlled by the rotation speed of the sprocket 34. Therefore, each of the plurality of links 20 is smoothly driven toward the front side (inlet side) without being get stuck on the rail 13A. Further, the rail holder 25 (see FIG. 4) sandwiching the rail 13B gradually decelerates following the deceleration of the rail holder 24. Then, it is possible to close the link 20 (in other words, minimize each angle θ1 shown in FIG. 3) before reaching the link replacement region 40.

As described above, the sprocket 34 assists the adjustment function of the link pitch obtained by changing the separation distance between the pair of rails. As a result, as shown in FIG. 11, the link 20 can be driven without being get stuck even when the link pitch is rapidly reduced in the portion in contact with the sprocket 34.

Also, the rotation diameter of the sprocket 34 (distance from the center of rotation to the tip of the tooth) is equal to the rotation diameter of the sprocket 32. Therefore, the ratio of the rotational speeds of the sprockets 32 and 34 is inversely proportional to the ratio of the numbers of teeth of the sprockets 32 and 34. For example, in the example shown in FIG. 11, since the number of teeth of the sprocket 32 is one-fifth of the number of teeth of the sprocket 34, the rotation speed of the sprocket 32 is five times the rotation speed of the sprocket 34.

Further, though not shown in the enlarged view, the number of teeth of the sprocket 33 shown in FIG. 2 is equal to the number of teeth of the sprocket 34. Also, the rotation diameter and rotation speed of the sprocket 33 are equal to the rotation diameter and rotation speed of the sprocket 34.

<Modification of Link Adjustment Mechanism>

Figure 12:
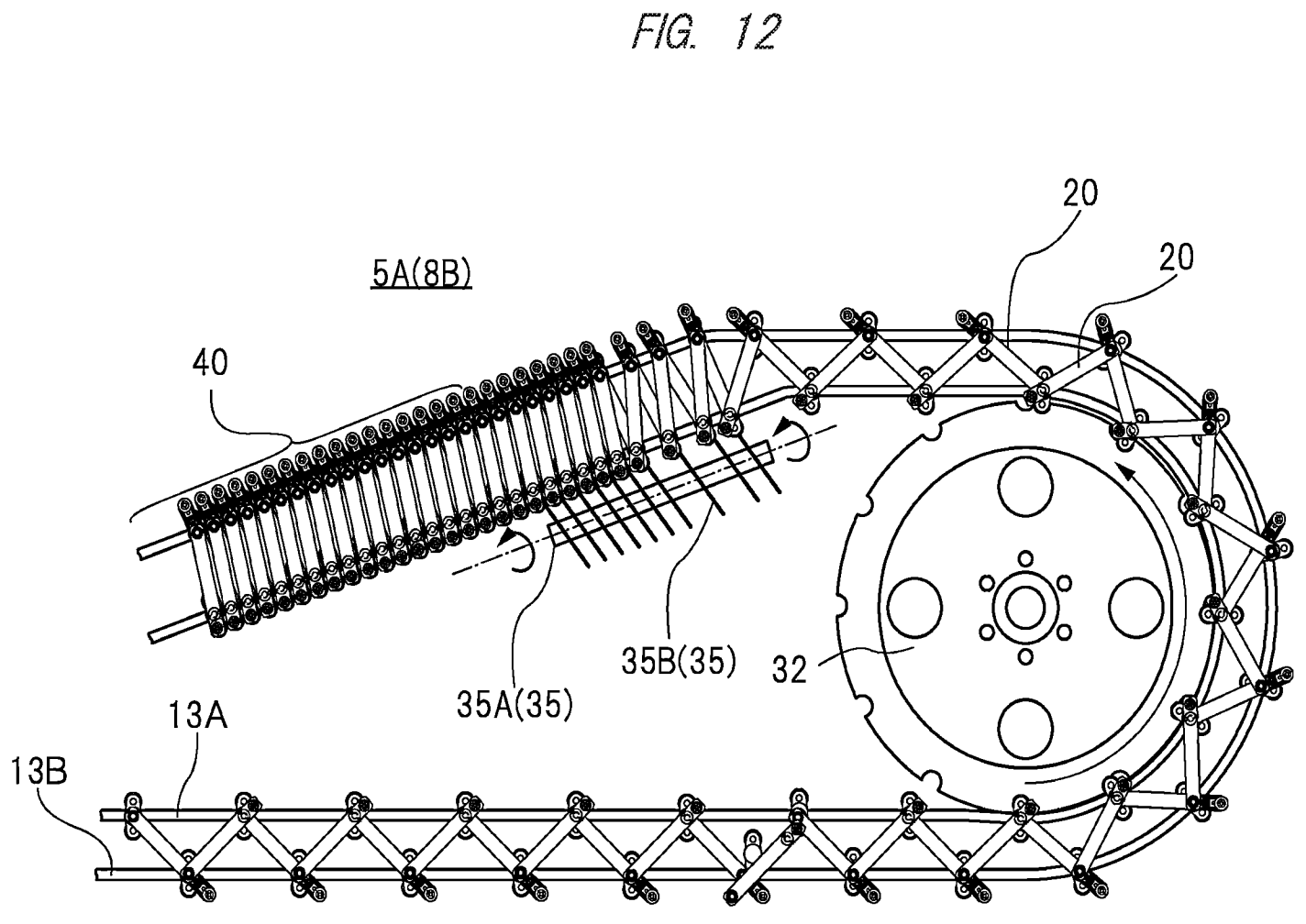

Next, a modification of the link adjustment mechanism will be described. FIG. 12 is an enlarged plan view showing a modification of the link adjustment mechanism shown in FIG. 11. A stretching apparatus 5A of the modification shown in FIG. 12 is different from the stretching apparatus 5 shown in FIG. 2 in using a screw (link adjustment mechanism) 35 as a link adjustment mechanism for reducing the link pitch of the plurality of links 20.

The screw 35 includes a shaft 35A extending along the rail 13A and a plurality of wings 35B provided around the shaft 35A. The screw 35 is a rotating body that rotates around the center of the shaft 35A as a rotation axis. When the screw 35 rotates, the plurality of wings 35B attached so as to be inclined with respect to the rotation axis rotates. When the screw 35 rotates, the engaging portion 29 (see FIG. 3 and FIG. 4) of the link 20 engages with a groove between the adjacent wings 35B. The screw 35 rotates so as to advance the plurality of links 20 from the outlet side 8B of the film 8 (see FIG. 2) to the inlet side 8A of the film 8 (see FIG. 2).

The screw 35 rotates at a rotation speed slower than the rotation speed of the sprocket 32. The engaging portion 29 provided in each of the plurality of links 20 engages with the groove between the adjacent wings 35B during the carry. Further, as shown in FIG. 12, the plurality of wings 35B of the screw 35 is attached such that the pitch of the engaging portions 29 (see FIG. 3 and FIG. 4) is gradually reduced in the extending direction of the shaft 35A. Also in the case of this modification, the separation distance between the rail 13A and the rail 13B rapidly increases in this region. At this time, since the rail 13A arranged on an inner side has a smaller turning radius than the rail 13B arranged on an outer side, the rail holder 24 is likely to be get stuck at the inner portion of the link 20 (around the rail holder 24 shown in FIG. 3 and FIG. 4).

In the case of this modification, the screw 35 for reducing the link pitch is arranged in the region where the separation distance between the rail 13A and the rail 13B rapidly increases. The screw 35 forcibly advances the engaging portion 29 of the link 20 forward. Further, the speed at which the screw 35 advances the link 20 forward is controlled by the rotation speed of the screw 35. Therefore, each of the plurality of links 20 is smoothly driven toward the front (inlet side) without being get stuck on the rail 13A. Further, the rail holder 25 (see FIG. 4) sandwiching the rail 13B gradually decelerates following the deceleration of the rail holder 24 (see FIG. 4). Then, it is possible to close the link 20 (in other words, minimize each angle θ1 shown in FIG. 3) before reaching the link replacement region 40.

As described above, the screw 35 assists the adjustment function of the link pitch obtained by changing the separation distance between the pair of rails. As a result, as shown in FIG. 11, the link 20 can be driven without being get stuck even when the link pitch is rapidly reduced in the portion in contact with the screw 35.

As can be seen by comparing FIG. 11 and FIG. 12, in the case of the stretching apparatus 5A of this modification, the area occupied by the apparatus on the outlet side 8B of the film 8 (see FIG. 2) can be further reduced. Also, the total extension distances of the rails 13A and 13B become shorter as compared with those in the example shown in FIG. 11. As a result, the total number of required links 20 can be reduced.

The stretching apparatus 5A shown in FIG. 12 is the same as the stretching apparatus 5 described with reference to FIG. 1 to FIG. 11 except for the above-mentioned differences. Therefore, the repetitive description will be omitted.

In the foregoing, the invention made by the inventors of the present invention has been concretely described based on the embodiments and examples. However, it is needless to say that the present invention is not limited to the foregoing embodiments and examples and various modifications can be made within the range not departing from the gist thereof.

For example, in the embodiment above, the total number of links 20 provided in the stretching apparatus, the weight of the ten links 20, the ratio of the rotation speeds of the sprockets, and the like have been described as examples. However, each of these values is not limited to the values mentioned above as long as they are within the range not departing from the gist of the described invention.

REFERENCE SIGNS LIST

1 thin-film manufacturing system
2 kneading extrusion apparatus (biaxial kneading extrusion apparatus)
2A raw material supply unit
3 T-die
4 raw sheet cooling apparatus
5, 5A stretching apparatus (simultaneous biaxial stretching apparatus)
6 take-off apparatus
7 winder apparatus
8 film
8A inlet side (inlet portion)
8B outlet side (outlet portion)
10A, 10B link device
11 central portion
12 heat treatment unit
13A, 13B rail
20, 20A, 20B, 20C, 20D link
20G1 take-out link group
20G2 replacement link group
21 clip
21A spring
21B grip portion
22 upper link plate
23 lower link plate
24, 25 rail holder
26 shaft
27 shaft
28 pin
29 engaging portion
31, 32, 33, 34 sprocket
35 screw
35A shaft
35B wing
40 link replacement region (first region)
41 region (second region)
42 band
F1 film (sheet, resin film)
θ1 angle

The invention claimed is:
1. A parts replacement method of a stretching apparatus comprising steps of:
(a) preparing a stretching apparatus including:
a pair of link devices configured to be able to carry and stretch a film and each composed of a plurality of links coupled to form an endless chain;
a heat treatment unit configured to cover a central portion of the pair of link devices and perform a heat treatment to the film;

a first link drive mechanism arranged outside the heat treatment unit and on an inlet side of the film and configured to drive the plurality of links;
a second link drive mechanism arranged outside the heat treatment unit and on an outlet side of the film and configured to drive the plurality of links; and
a link adjustment mechanism arranged outside the heat treatment unit and on the outlet side of the film and configured to reduce a pitch of the plurality of links;
(b) binding a take-out link group composed of some links included in the plurality of links in a link replacement region located on an outlet side of the film of each of the pair of link devices and carrying out the take-out link group from the link replacement region of the pair of link devices;
(c) after the (b), arranging a replacement link group in a bound state composed of the same number of links as the take-out link group, on the pair of rails in the link replacement region;
(d) after the (c), driving the plurality of links such that the replacement link group is advanced to a side of the heat treatment unit and a new take-out link group is pressed into the link replacement region; and
(e) replacing all of the links provided in the pair of link devices by repeatedly performing the step (b), the step (c), and the step (d).
2. The parts replacement method of the stretching apparatus according to claim 1,
wherein each of the pair of link devices has a film side facing the film and a return side located opposite to the film side,
wherein each of the pair of link devices includes a pair of rails composed of an inner rail and an outer rail,
wherein each of the plurality of links is arranged on the pair of rails,
wherein each of the inner rail and the outer rail is annularly formed across the inlet side of the film, the heat treatment unit, and the outlet side of the film,
wherein each of the first link drive mechanism, the second link drive mechanism, and the link adjustment mechanism is arranged on an inner side of the inner rail,
wherein a separation distance between the inner rail and the outer rail varies for each of regions in which the inner rail and the outer rail are arranged, and
wherein the separation distance between the inner rail and the outer rail in a first region located between the link adjustment mechanism and the heat treatment unit on the return side of the pair of link devices is the largest among all of the regions.

* * * * *